United States Patent [19]
Keylwert

[11] 3,867,911
[45] Feb. 25, 1975

[54] ROTARY PISTON INTERNAL COMBUSTION ENGINE

[75] Inventor: Johann Keylwert, Cologne, Germany

[73] Assignee: Klockner-Humboldt-Deutz AG, Cologne, Germany

[22] Filed: Feb. 7, 1974

[21] Appl. No.: 440,353

[30] Foreign Application Priority Data
Feb. 8, 1973 Germany............................ 2306060

[52] U.S. Cl................ 123/8.15, 60/39.61, 60/39.63, 123/8.33
[51] Int. Cl............................................. F02b 55/14
[58] Field of Search ....... 123/8.19, 8.27, 8.33, 8.15; 60/39.61, 39.63, 39.43; 418/61 B

[56] References Cited
UNITED STATES PATENTS

| | | | |
|---|---|---|---|
| 1,434,446 | 11/1922 | McQueen............................ | 123/8.31 |
| 2,511,441 | 6/1950 | Loubiere............................ | 60/39.61 |
| 3,193,186 | 7/1965 | Peras................................. | 418/61 B |
| 3,224,421 | 12/1965 | Peras................................. | 418/61 B |
| 3,823,694 | 7/1974 | Mazzagatti........................ | 123/8.27 |

FOREIGN PATENTS OR APPLICATIONS
1,218,579 1/1971 Great Britain .................... 418/61 B Primary Examiner—C. J. Husar
Assistant Examiner—O. T. Sessions
Attorney, Agent, or Firm—Walter Becker

[57] ABSTRACT

A rotary piston internal combustion engine with one or more rotary pistons on an eccentric and with a common combustion chamber fixedly connected to the engine housing and communicating through two conduit systems with working chambers. Each of these conduit systems has a mouth in those housing end walls which are located adjacent the respective adjacent piston end faces, and more specifically in the vicinity of the sealing strips between an inner axial seal and an outer axial seal, each of the two conduit systems also including transfer passage means provided in the pistons. The transfer passage means have a smaller flow cross section than the inlet and outlet means of the piston or pistons and respectively comprise a mouth opening within the region of the periphery of the piston or pistons without inlet and outlet control opening as well as on an end face of the piston or pistons. The path curve of the mouth openings at the end faces of the piston or pistons extend radially outside the inner axial seal and moves successively over the mouth openings of the two conduit systems in the side walls of the engine housing.

20 Claims, 8 Drawing Figures

ROTARY PISTON INTERNAL COMBUSTION ENGINE

The present invention relates to an inner rotary piston internal combustion engine with parallel axes and with interengagement, with sealing strips arranged on the mantle and with a piston the circumference of which is divided by a number of axes-near zones or lobes dividable by the number two, said zones being divided into sections of which each other section is provided with inlet and also with outlet openings. These openings communicate through passages in the piston with inlet and outlet openings provided in the end faces of the end piston while the path of said last mentioned inlet and outlet openings are surrounded by an inner axial seal.

An internal combustion engine of this type is disclosed for instance in German Offenlegungsschrift No. 1,526,349. This known rotary piston internal combustion engine has the piston arranged in an overhung position and operates in conformity with a four-stroke cycle method which is self-controlled by slots, and with intermittent combustion.

In view of the ever strict requirements concerning emissions of an internal combustion engine, internal combustion engines with a continuous combustion are getting again into the foreground. The continuous combustion in a central combustion chamber has the advantage that approximately ideal combustion conditions can be created which assure a better exhaust gas quality. Furthermore, the means for the injection and the control of the combustion can be much simpler than is the case with intermittent combustion. While during the intermittent combustion a limitation of the speed is dictated by the feeding-in of the fuel into the combustion chamber, the reaction speed and the delay in the ignition, the speed during the continuous combustion is limited primarily only by the flow speed during the transfer from the combustion chamber to the working chambers. The feeding of the fuel and the combustion of the fuel in the combustion chamber is to a major extent dependent on the speed of the engine and can be effected by simple means. Furthermore, a light and space-saving construction can be realized because the working pressure is limited to the respective compression and no uncontrolled excess of ignition pressure will occur. Also the thermal load of the piston is considerably more favorable in view of the absence of temperature and pressure peaks in the working process.

Internal combustion engines with continuous inner combustion are known in the form of reciprocable piston internal combustion engines and also in the form of rotary piston internal combustion engines. German Pat. No. 452,900 discloses a two-cylinder reciprocable piston internal combustion engine according to which one piston operates as compressor and at the end of the compression stroke transfers the compressed air volume to the combustion chamber, whereas the second piston after passing through the upper dead center point withdraws driving gas from the combustion chamber and moves the same into the atmosphere after the piston has passed through the lower dead center point. According to German Pat. No. 863,151, it has become known to have a piston expansion engine cooperate with a compressor set which has intermediate coolers and after the end stage conveys the compressed air through a heat exchanger into the combustion chamber, said heat exchanger being used for taking advantage of the excess gas energy.

In German Pat. No. 933,717, a reciprocable piston internal combustion engine has become known with a compressor and with a working part according to which the pistons are provided with screw-shaped interengaging ribs and grooves.

Internal combustion engines with separate compressor and working part have the drawback of having a large structural volume. Furthermore, at the point of the transfer of the driving gases from the combustion chamber to a working chamber, a considerable pressure differential occurs between the two chambers which pressure differential results in losses in the pushing force and therefore has a poor degree of efficiency. Furthermore, the working chambers and the control and sealing members which are associated with said working chambers are continuously exposed by the hot driving gases to a high thermal load.

Finally, a reciprocable piston internal combustion engine of the type of an axial piston engine has become known by German Offenlegungsschrift No. 1,776,047, according to which circulating working chambers are prior to reaching the upper dead center point of corresponding pistons brought into communication with a central combustion chamber through slots and passages while the drawn-in and compressed combustion air is conveyed into the combustion chamber. These working chambers will after reaching the upper dead center point receive hot driving gases from the combustion chamber and will expand said driving gases. The internal combustion engine operates in conformity with a two-stroke cycle method with scavenging the working chambers within the region of the lower dead center point. With this type of engine, difficulties are encountered with the mounting, lubricating and cooling of the rotating working chambers and pistons and also difficulties are encountered with regard to the balancing of the free mass moments. Furthermore, the output is possible on only one end side or end face of the internal combustion engine. Finally, the two-stroke cycle method is suitable only for relatively long stroke internal combustion engines.

It is, therefore, an object of the present invention to provide a compact internal combustion engine with inner continuous combustion, which engine will have a high output density combined with a simple transmission or gearing and will be free from the above outlined drawbacks.

These and other objects and advantages of the invention will appear more clearly from the following specification in connection with the accompanying drawings, in which:

FIG. 1 diagrammatically illustrates a longitudinal section through a rotary piston internal combustion engine according to the invention in which two pistons are mounted on a common eccentric.

FIG. 2 is a cross section taken along the line II—II of FIG. 1, and is shown on a somewhat larger scale than that of FIG. 1.

FIG. 3 likewise illustrates on a larger scale a section along the line III—III of FIG. 1, furthermore, the contour of the piston is shown with thin lines and the projections of the inlet, outlet and transfer passages are indicated by dash lines.

Figure 1:
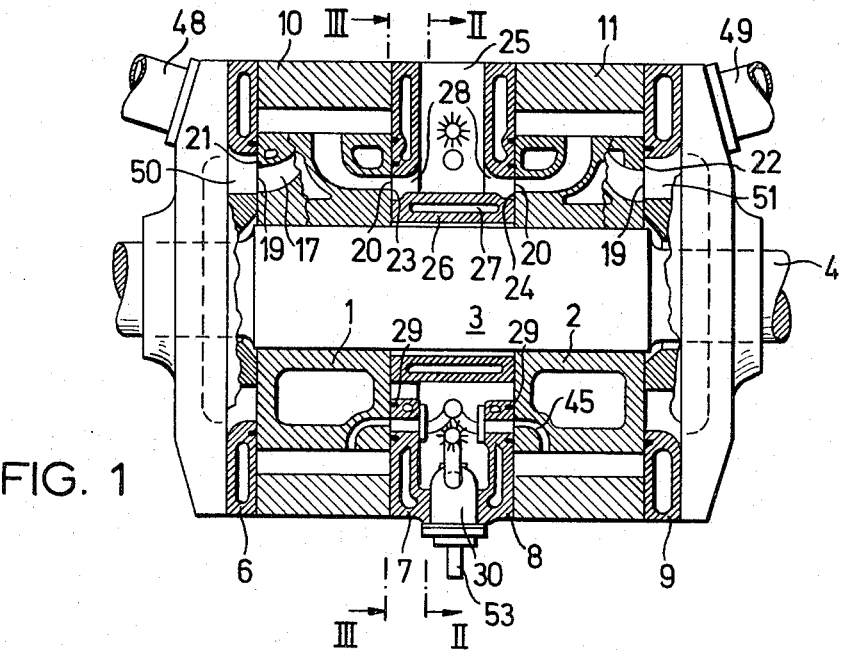
Figure 2:
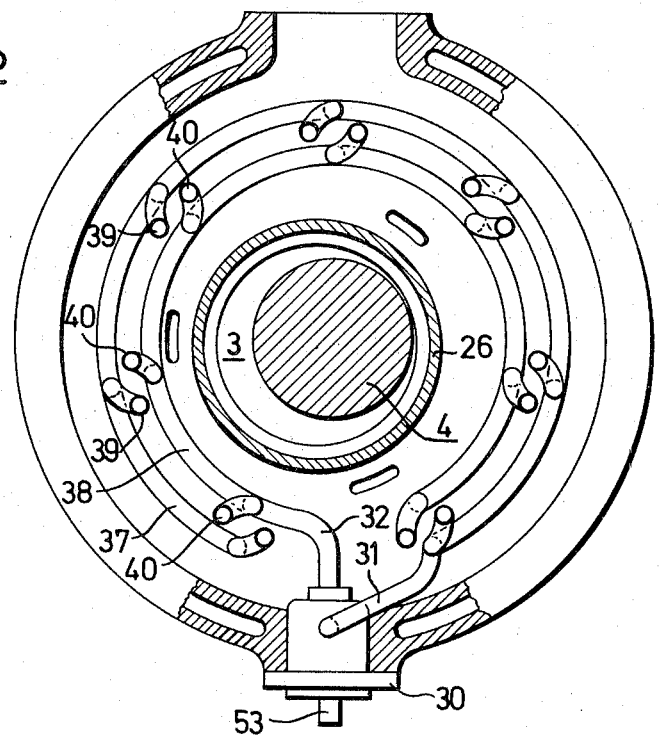

The rotary piston internal combustion engine according to the present invention is characterized primarily in that the internal combustion engine has a common combustion chamber which is fixedly connected to the housing and which communicates with working chambers through two conduit systems, and respectively has a mouth opening in those end faces of the lateral part of the housing on the piston side which are located in the vicinity of the sealing strips between the inner axial seal and the outer axial seal. The combustion chamber furthermore communicates with working chambers through transfer passages in the piston. These transfer passages have a smaller flow cross section than the above mentioned inlet and outlet passages and respectively have a mouth opening within the region of the circumference of the piston without inlet and outlet opening and also on an end face of the piston. The path of the mouth openings at the face side extends outside the inner axial seal, and the mouth openings of the two conduit systems successively merge with the side parts of the housing.

In view of this design according to the invention, it is possible in an internal combustion engine without additional movable control elements to practice a four-stroke cycle method with continuous inner combustion. Moreover, the engine has an overall smaller structural volume and a simpler transmission or gearing construction. In this connection, it is important that the mouth openings in the lateral parts which are adjacent the piston side and pertain to the housing are separated by an axial seal from the inlet and outlet openings in the end faces of the piston.

For purposes of obtaining a better seal, it is advantageous that the mouth openings are located in the lateral parts of the housing within an outer axial seal. Said outer axial seal extends between the mouth openings pertaining to the individual working chambers and extends up to the inner axial seal. A particularly effective and simple form of the outer axial seal is obtained when in conformity with a further development of the invention the outer axial seal is formed by a plurality of seals which surround the mouth openings in the lateral part of the housing in the manner of a ring and are arranged directly or indirectly adjacent the inner axial seal. In this way, the mouth openings for each working chamber are sealed against the working chambers and are once more sealed relative to the inlet and outlet openings in the end faces of the piston by the inner axial seal.

In order to prevent the flow of fresh air and working gas within the region of the mouth openings, it is expedient between the mouth openings to provide web-shaped sealing strips which divide the inner surfaces of the annular axial seals.

Fundamentally, it is possible to provide a transfer passage for each piston part between the regions with the inlet and outlet passages while the mouth openings associated with each working chamber are located in the lateral parts of the housing. However, in order to prevent a flow reversal in the transfer passages and to obtain a further separation between the fresh air and the exhaust gases, it is advantageous that for each conduit system there are provided separate transfer passages or channels. According to a further development of the invention, the mouth openings of the transfer passages of both conduit systems are located in an end face of the piston and describe radially offset paths on which are located the corresponding mouth openings in the lateral parts of the housing. This is advantageous when the combustion chamber is located at the corresponding end face of the internal combustion engine. If, however, the internal combustion engine surrounds the housing mantle in the form of a ring or if the combustion chamber for other reasons has no preferred position with regard to an end face, it may be expedient according to a further development of the invention, that the mouth openings of one conduit system are arranged in one side part of the housing whereas the mouth openings of the other conduit system are located in the oppositely located side part of the housing and correspondingly the mouth openings which are located at the end face and pertain to the transfer passages of each conduit system are located on different end faces of the piston. For exploiting the high waste gas energy, it will for purposes of improving the degree of efficiency of the engine be necessary to provide a heat exchanger by means of which the waste gas heat is conveyed to the compressed fresh air. The design of such heat exchanger and its mounting is particularly favorable when in conformity with a further development of the invention the inlet openings are arranged on one end face and the outlet openings are arranged on the other end face of the piston and when on the end face with the outlet openings there are also provided the mouth openings of the transfer passages. The conduit system through which fresh air is conveyed to the combustion chamber is provided with additional heat exchanger surfaces for instance in the form of fins, whereas the other conduit system is heat insulated.

The control of the internal combustion engine may be effected by throttling means by means of which the throughflow through the combustion chamber is controlled. Another possibility of controlling consists in that the position of the mouth openings is changed relative to the upper dead center position of the piston so that a smaller quantity of air is conveyed at a lower pressure and a smaller quantity is withdrawn from the combustion chamber. The adjustment relative to the upper dead center point may be obtained by simple means in conformity with a further development of the invention. More specifically, this may be obtained by arranging the mouth openings in the side parts of the housing in a rotatable annular part which likewise receives the outer axial seal which within the region of the sealing strips has a curvature in conformity with a circle the center of which is located on the axis of rotation of the annular part. By turning the annular part by means of customary adjusting devices of a mechanical, hydraulic or electric type, it is possible to vary the position of the mouths within certain limits without the outer axial seal losing its connection with the radial seal.

A further possibility consists in that the mouth openings are located in the side parts of the housing on the piston side and, more specifically, are eccentrically arranged in rotatable discs in the form of slots. By turning the discs by suitable adjusting means, it is likewise possible to change the position of the mouth openings with regard to the upper dead center point. The slot-shaped design of the mouth openings will bring about that always a sufficient overflow cross section is located within the region of the path of the mouth openings of the transfer passages.

The combustion chamber for the continuous combustion works all the better the more uniform the air put through is relative to the chamber capacity. Internal combustion engines with a plurality of working chambers are therefore better suitable than those with only a few working chambers.

The internal combustion engine of the type involved is particularly well suitable for this type of combustion because a great number of working chambers can be arranged over a small space. According to a further development of the invention, it is expedient to design the piston cross sectional contour in the form of a multi-arc epitrochoid with more than two arcs. In view of the greater number of arcs of the piston cross sectional contour, it is easier to provide the paths of the mouth openings of the transfer passages and of the inlet and outlet passages in the given frame.

The seal of the oil conducting chambers relative to the hot waste gases and the exploitation of the waste gas energy by heat exchangers can be designed particularly favorable when the basic shape of the engine has two pistons which are separate from each other and are mounted on a common eccentric while the outlet openings of said pistons face each other and while the inlet openings are located on the other end faces of the pistons. The seal of the oil conducting chambers relative to the hot waste gases and the seal of the waste gas energy by heat exchangers can furthermore be very favorably realized if the inlet openings lead into a common annular collecting chamber which is located between those end faces of the pistons which face each other, and if the collecting chamber is located radially outside of an intermediate ring which sealingly surrounds the eccentric shaft while the pistons are interconnected by said intermediate ring. Expediently, also the combustion chamber is arranged in the collecting chamber. Favorable structural possibilities are likewise obtained when the eccentric shaft is journalled on one end and the outlet openings and the transfer openings in the end faces of the piston point to the free end side of the engine. Also in this instance, the oil conducting parts have to be well separated from those parts which are acted upon by hot gases. Furthermore, according to a further development of the invention, it is possible to have the housing part of the bearing-free end face of the engine arranged rotatably so that the position of the mouth openings of the conduit systems may be varied with respect to the upper dead center point. This embodiment also permits a rigid connection of the combustion chamber with the rotatable side part whereby movable seals will be avoided.

Figure 3:
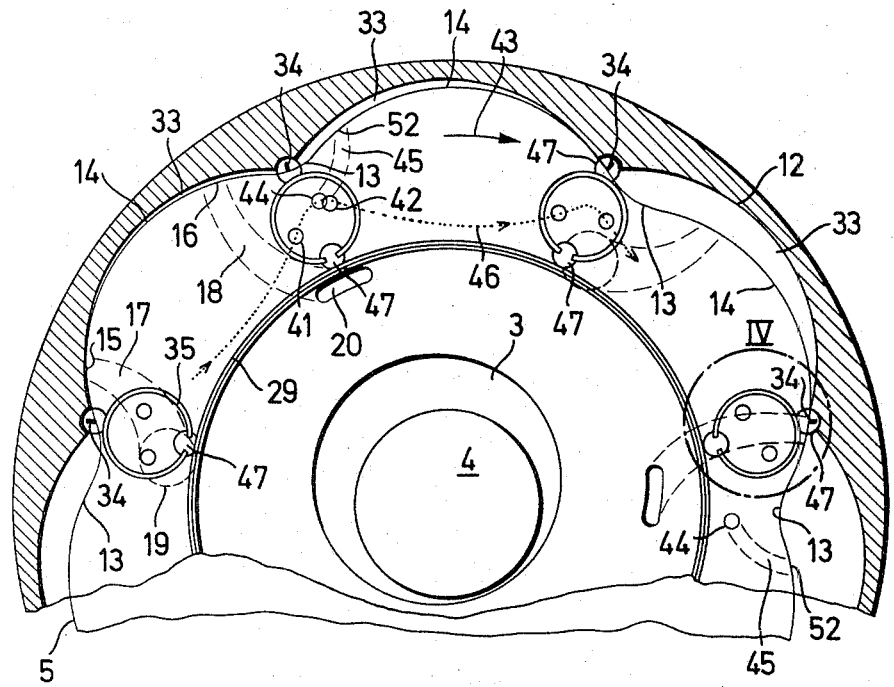

Referring now to the drawings in detail, the illustrated internal combustion engines are interior rotary piston internal combustion engines with parallel axes and mutual interengagement. The internal combustion engine shown in FIG. 1 has two pistons 1 and 2 which are journalled on a common eccentric 3 of an eccentric shaft 4. The cross sectional contour 5 of said pistons is shown in FIG. 3 and is determined by an epitrochoid with six arcs or six lobes.

The eccentric shaft 4 is journalled in a housing which is composed primarily of said parts 6, 7, 8 and 9 and of mantles 10, 11 arranged therebetween. The inner cross sectional confinement 12 (FIG. 3) of the mantles 10 and 11 is determined by the outer enveloping curve of the cross sectional contour 5 of pistons 1 and 2. By the given geometric forms, the circumferences of the pistons 1 and 2 are divided by an even number of axes near zones or lobes 13 in uniform sections 14 of which every other section is provided with inlet control openings 15 and outlet control openings 16 which are connected by means of passages 17 and 18 in pistons 1 and 2 with inlet openings 19 and 20 provided in the end faces 21, 22 and 23, 24 respectively. The outlet openings 20 are thus located in those end faces 23 and 24 which face each other.

The side parts 7 and 8 are compounds to one structural part and form a collecting chamber 25 which is sealed relative to the eccentric 3 by a sleeve 26 interconnecting the pistons 1 and 2. The sleeve 26 may be designed so strong that it may serve for equalizing the torques of two pistons 1 and 2. In the illustrated embodiment, the sleeves 26 have a cooling chamber 27.

The collecting chamber 25 continuously communicates through annular gaps 28 formed between the sleeve 26 and the side parts 7 and 8, with the outlet openings 20 the path curves of which are surrounded by an inner axial seal 29.

Inserted into the collecting chamber 25 is a combustion chamber which is fixedly connected to the housing and is common to both pistons 1 and 2. The combustion chamber 30 communicates through two conduit systems 31 and 32 with working chamber 33. The working chambers 33 are formed by the piston circumferential surface, the inner mantle surface and the corresponding regions of the side parts and are sealed relative to each other by radial sealing strips 34 arranged on the mantles 10 and 11 and by axial seals 29 and 35; 36 which are arranged in the side parts 6, 7, 8 and 9.

The conduit systems 31 and 32 consist of an annular conduit 38, 37 from which branches 39, 40 lead to the mouth openings 41, 42 in the side parts 7 and 8. When the pistons 1, 2 rotate in the direction indicated by the arrow 43, the mouth openings 41, and 42 are passed over by mouth openings 44 of pertaining transfer passages 45 which are rotated in the end face 23, 24 of pistons 1 and 2 respectively. The path curve 46 of the mouth openings 44 is shown in FIG. 3 by a dotted line. FIG. 3 also shows that the mouth openings 41 and 42 are relative to the upper dead center point in the path curve 46 so arranged that the mouth openings 41 are passed over by the mouth openings 44 ahead of the upper dead center point of the pistons and the mouth openings 42 are passed over behind the upper dead center point.

Figure 5:
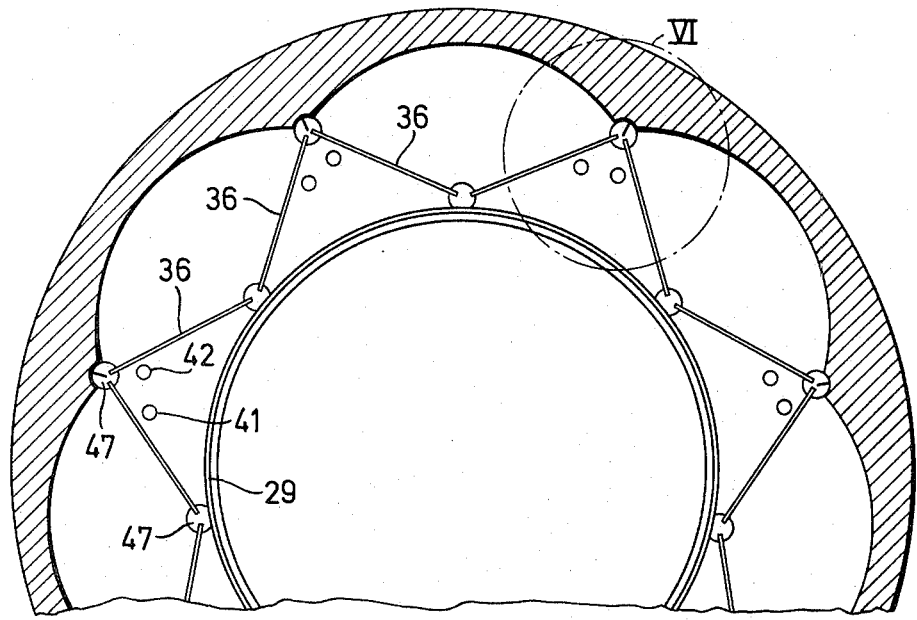
FIG. 5 represents a section similar to that of FIG. 3 but with a modified outer axial seal.

Instead of the illustrated embodiment according to which only one transfer passage 45 is provided for each piston circumferential range 14 without inlet and outlet opening and according to which the overflow openings 41 and 42 are located on the path curve 46, it is also possible for preventing a flow reversal, to provide two overflow passages in the transfer passage 45. The mouth openings at the end face side and pertaining to said transfer passages are located either in different end faces of the piston or described radially offset path curves on which corresponding mouth openings are located in the side parts of the housing. The mouth openings 41 and 42 are surrounded by annular axial seals 35 which by means of sealing bowls 47 border on the inner axial seal 29 and on the radial sealing strips 34. The described shape as illustrated in FIG. 3 may also be replaced by a customary axial seal arrangement as shown in FIG. 5 in which instance the mouth openings 41 and 42 are located between an outer axial seal 36 and the inner axial seal 29.

The operation of the rotary piston internal combustion engine according to the present invention is as follows.

Fresh air is drawn in through intake conduits 48, 49 at the side parts 6 and 9 respectively through feeding passages 50 and 51, inlet openings 19, inlet passages 17 and inlet control openings 15 when the corresponding working chambers 33 increase in volume. When the control opening 15 passes over the sealing strip 34 which in the direction of rotation of the piston is located nearest, the intake cycle is completed. During the further rotation of the piston, the fresh air in the working chamber 33 is compressed until the transfer passage 45 passes with its mouth opening 44 at the end face over the mouth opening 41 and by means of its mouth opening 52 at the periphery of the piston establishes the connection with the working chamber 33. The decrease in the volume of the working chamber 33 while the opening 41 is passed over by the mouth opening 44 serves for feeding compressed air through the conduit system 39 into the combustion chamber 30. By controlling the shape and position of the mouth opening 41, this operation can be adapted to the requirements of the engine. The fresh air passing into the combustion chamber 30 serves for combustion of the fuel which is fed through a connection 53. The combustion chamber 30 has a volume which is a multiple of the volume conveyed per cycle so that even in case of a change in the load, a continuous combustion will be possible.

During the further rotation of the piston, the mouth opening 44 will after passing over that point of the path 46 which corresponds to the dead center point position of the piston, pass over the mouth opening 42. In this connection, a volume of hot waste gas will in view of the working increase in the working chamber 3 during the passing over the mouth opening 42 be withdrawn from the combustion chamber 30 which volume of hot waste gas is during the further course expanded and discharged from the working chamber 33 as soon as the next following outlet control opening 16 has passed over the next following sealing strip 34 when looking in the direction of rotation of the piston. During the further course of the operation the working cycle is repeated inasmuch as the working cycle starts with the passing of an inlet control opening 15 passing over that sealing strip 34 which is located next when looking in the direction of rotation of the piston.

A particular advantage is seen in the fact that the pressure in the working chambers corresponds to the pressure in the combustion chamber 30 when the mouth opening 44 passes over the mouth openings 41 and 42. In this way, losses in pushing power during the transfer of the volumina between the working chambers and the combustion chamber are substantially avoided. Furthermore, waste gas passes around the conduit system 31 through which the fresh air passes into the combustion chambers so that compressed air will be heated and a portion of the waste gas energy is recovered.

Figure 4:
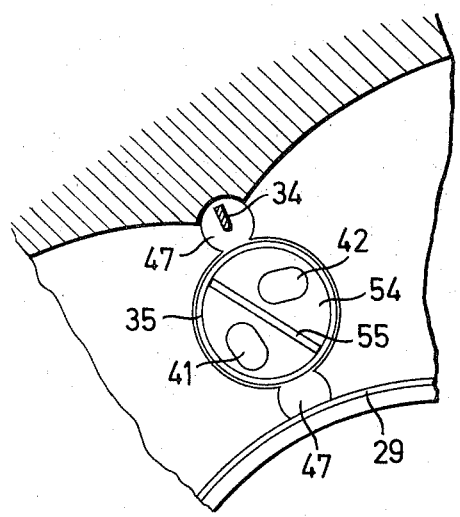
FIG. 4 shows that part of FIG. 3 in FIG. 3 is shown within a dot-dash circle marked IV, but the showing of FIG. 4 is slightly modified over the showing within the dot-dash circle of FIG. 3.

FIG. 4 shows an arrangement by means of which a simple control of the internal combustion engine will be made possible. More specifically, the mouth openings 41 and 42 are designed in the form of slots and are arranged in a rotatable disc 34 which can be rotated by suitable or common adjusting means not illustrated in the drawing. Due to such rotary adjustment, the location of the mouth openings 41 and 42 with regard to the upper dead center point of the path 46 is changed whereby the height of the compression pressure and the quality of the volume to be passed through will be determined. This arrangement furthermore shows the specific features that between the mouth openings 41 and 42 there is provided a web-shaped sealing strip 55 which brings about an improved separation between fresh air and waste gas.

Figure 6:
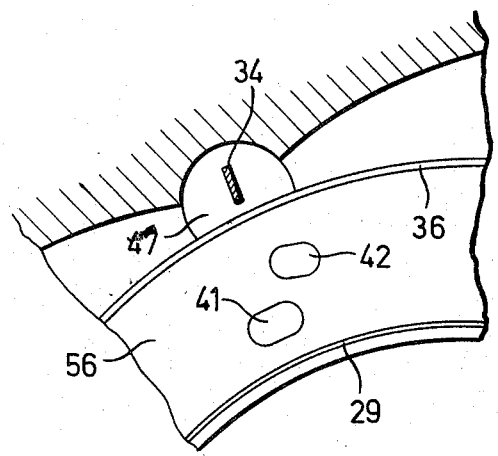
FIG. 6 shows the arrangement of the mouth opening in the lateral parts of a rotatable ring member.

FIG. 6 shows a similar possibility for controlling the internal combustion engine. More specifically, the slot-shaped mouth openings 41 and 42 are arranged in a rotatable annular part 56 of a side part of the housing. This annular part 56 simultaneously contains the outer radial seal 36 which in this instance within the region of the sealing strips has a curvature corresponding to a circle, the center point of which is located on the axis of rotation of the annular part 56.

Figure 7:
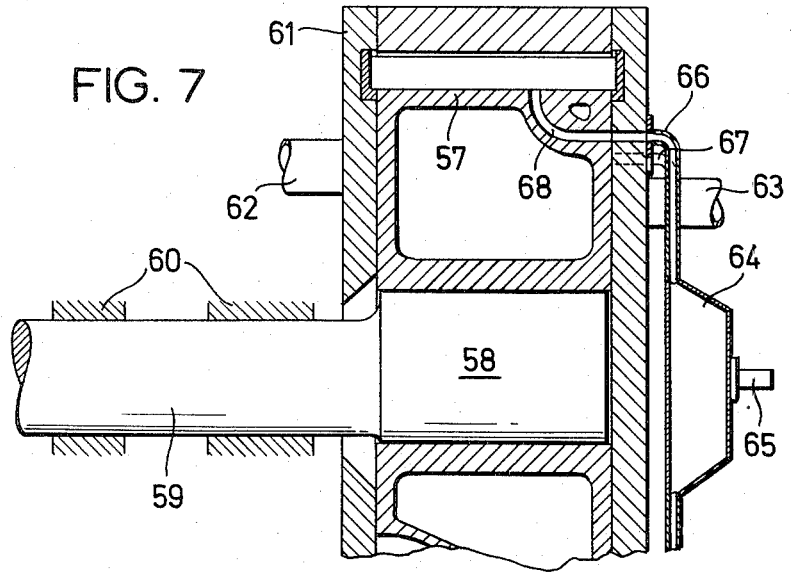
FIG. 7 illustrates a longitudinal section through a rotary piston internal combustion engine with a unilateral mounting of the piston.
Figure 8:
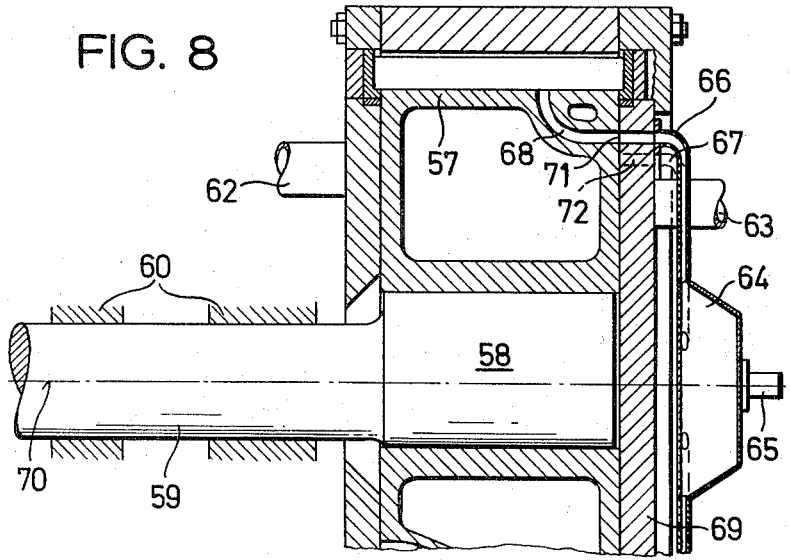
FIG. 8 represents a longitudinal section through a rotary piston internal combustion engine according to FIG. 7 but with a rotatable housing part.

FIGS. 7 and 8 illustrate portions of an engine according to the invention which functions in the same manner as the engine illustrated in FIGS. 1 and 6. They differ, however, from the above described invention in that only one piston 57 is provided which is journalled on an eccentric 58 of an eccentric shaft 59. As will be seen from the drawing, the eccentric shaft 59 is journalled at one side only, namely in the bearings 60. At the bearing side, the housing 61 has inlet conduit 62 whereas the outlet conduits 63 are arranged at the free end face of the engine. Similarly, at the free end face there is provided a combustion chamber 64 with a fuel supply line 65. The combustion chamber 64 is through two conduit systems 66 and 67 in communication with a transfer passage 68 in the manner described above. This design of the engine has major advantages with regard to the mounting or provision of the combustion chamber 64 and also with regard to the accessibility of the conduit systems. The design according to FIG. 8 is similar to being modified over FIG. 7 in that one side part 69 is rotatably arranged in the housing while the combustion chamber 64 is connected to the rotatable side part, and the fuel supply line 65 is arranged coaxially with regard to the axis of rotation 70. By rotating the rotatable side part 69 it will be possible to vary the location of the mouth openings 71 and 72 with regard to the upper dead center point position in the above described manner. For this purpose customary adjusting elements may be employed which have not been illustrated in the drawing.

It is, of course, to be understood that the present invention is, by no means, limited to the specific showing in the drawings but also comprises any modifications within the scope of the appended claims.

What I claim is:

1. A rotary piston internal combustion engine, which includes: housing means having end walls and mantle means located between said end walls and connected thereto, rotary piston means eccentrically rotatable within said housing means and having outer peripheral surface means with an even number of circumferentially evenly distributed axis-near zones interconnected by radially outwardly arched zones thereby dividing said outer peripheral surface means into an even number of peripheral sections, the inner surface of said housing means being provided with a number of lobes and arcs corresponding in number to one more than the number of axis-near zones of said piston means and corresponding in shape to the arcs and axis near zones of said piston means and adapted to form working chambers therewith the size of which varies during a revolution of said piston means, inlet and outlet control openings respectively associated with every other one of said sections, inlet and outlet means respectively provided in end faces of said piston means, inlet and outlet connecting passage means arranged in said piston means and respectively connecting said inlet and outlet control openings with said inlet and outlet means, inner axial sealing means arranged radially outwardly of the path of movement of said outlet means during rotation of said piston means, combustion chamber means fixedly connected to said housing means, first and second conduit means connected to said combustion chamber means, transfer passage means located in said piston means and adapted to communicate with said working chambers, said first and second conduit means and said transfer passage means being adapted to establish communication between said combustion chamber and respective working chambers, said transfer passage means having a smaller cross section than said inlet and outlet connecting passage means and each respectively comprising a mouth opening located in the region of the piston circumference and on an end face of said piston means, the path of movement of said mouth openings being located outside said inner axial sealing means and moving successively over the mouth openings of said two conduit systems in side walls of said housing means.

2. An engine according to claim 1, in which said piston means includes: a plurality of coaxially arranged axially spaced pistons rotatably connected to each other, and in which said combustion chamber means are located between and common to said piston means.

3. An engine according to claim 1, which includes outer axial sealing means formed by a plurality of seals surrounding the mouth openings in side walls of said housing means and arranged near said inner axial sealing means.

4. An engine according to claim 3, in which the individual parts of the outer axial sealing means enclose the mouth openings located in side walls of said housing means and are associated with the respective working chamber.

5. An engine according to claim 2 in which web-shaped sealing strips are provided between said mouth openings, said sealing strips subdividing the inner surface of said outer axial sealing means.

6. An engine according to claim 1, in which separate transfer passage means are respectively provided for said first and second conduit means.

7. An engine according to claim 6, in which the mouth openings of said separate transfer passage means are located in an end face of said piston means and are adapted to describe radially offset path curves along which the corresponding mouth openings in the end walls of said housing means are located.

8. An engine according to claim 6, in which said mouth openings of said first conduit means are arranged in a side wall of said housing means and which the mouth openings of the said second conduit means are located in the oppositely located side wall of said housing means and that accordingly the mouth openings at said side walls and pertaining to said transfer passages of each of said first and second conduit means are located on different end faces of said piston means.

9. An engine according to claim 1, in which the inlet openings are located in one end face of said piston means and the outlet openings are located on the other end face of said piston means while in said end face with said outlet openings there are furthermore located the mouth openings of said transfer passage means.

10. An engine according to claim 8, which includes a rotatable annular member arranged in the side walls of said housing means and comprising the mouth openings of said side walls of said housing means, said outer axial sealing means likewise being located in said rotatable annular member, said outer axial seal being within the region of said sealing strips provided with a curvature corresponding to a circle with the center point thereof located on the axis of rotation of said annular member.

11. An engine according to claim 9 in which the mouth openings in the side walls of said housing means are slot-shaped and eccentrically arranged in rotatable discs.

12. An engine according to claim 1, in which the cross sectional contour of said piston means has the shape of a multi-arc epitrochoid with more than two arcs.

13. An engine according to claim 1, in which said piston means comprises two pistons axially spaced from each other and mounted on a common eccentric while said outlet means are arranged on those end faces of said two pistons which face each other, said inlet means being located on the other two end faces of said two pistons, those end faces of said two pistons which face each other partially defined with each other a collecting chamber having said first and second conduit means arranged therein, and intermediate ring means located in said collecting chamber and sealingly surrounding the eccentric supporting said pistons while interconnecting the same.

14. An engine according to claim 1, in which said first conduit means is adapted to be connected to a supply of fresh air for conveying the same to said combustion chamber means and is equipped with heat exchanger surfaces, and in which said second conduit means is heat insulated toward the outside.

15. An engine according to claim 13, in which said combustion chamber means is arranged in said collecting chamber.

16. An engine according to claim 1, which includes an eccentric supporting said piston means and unilaterally mounted in said housing means, said outlet means and said mouth of said transfer passage means in the end faces of said piston means pointing toward the free end wall of said engine.

17. An engine according to claim 16, in which said end wall of said housing of the bearing free end wall of the engine is rotatable so that the position of the mouth openings of said first and second conduit means is variable relative to the upper dead center point of said piston means.

18. An engine according to claim 16, in which said combustion chamber means is connected to the rotatable side wall of said housing.

19. An engine according to claim 18, which includes fuel supply means arranged coaxially with regard to the axis of rotation of said piston means.

20. An engine according to claim 19, which includes yieldable connecting means for connecting said fuel supply means to said combustion chamber means.

* * * * *